United States Patent [19]

Kreiner et al.

[11] Patent Number: 4,990,786
[45] Date of Patent: Feb. 5, 1991

[54] METHOD AND APPARATUS FOR DETERMINING THE ACTUAL ARTIFICIAL AEROSOL ALPHA ACTIVITY CONCENTRATION IN THE AIR

[75] Inventors: Hans-Jurg Kreiner, Munich; Eberhard Frenzel, Erlangen, both of Fed. Rep. of Germany

[73] Assignee: FAG Kugelfischer Georg Schafer (KGaA), Fed. Rep. of Germany

[21] Appl. No.: 341,532

[22] Filed: Apr. 21, 1989

[51] Int. Cl.$^5$ .......................... G01T 1/16; G01T 7/00; G01T 1/18; G01T 1/185

[52] U.S. Cl. ................................. 250/380; 250/385.1; 250/255; 250/379

[58] Field of Search ................ 250/252.1 R, 253, 255, 250/374, 375, 379, 380, 385.1, 432 R, 394, 395

[56] References Cited

U.S. PATENT DOCUMENTS 4,700,067 10/1987 Carossi et al. ................... 250/380
4,820,925 4/1989 Balmer et al. ................... 250/379

FOREIGN PATENT DOCUMENTS 680369 2/1964 Canada ........................... 250/385.1
3542306 6/1987 Fed. Rep. of Germany ... 250/385.1
0588817 9/1983 U.S.S.R. ........................... 250/253

Primary Examiner—Constantine Hannaher
Assistant Examiner—Edward J. Glick
Attorney, Agent, or Firm—Ostrolenk, Faber, Gerb & Soffen

[57] ABSTRACT

The Alpha Energy Range Discrimination (AERD) method employs first and second proportional counter tubes separated by a foil and an electronic evaluation system, and comprises the following steps:

(a) a filter is disposed in the stream of air flow and is thereby covered with dust, no artificial aerosol alpha activity being present;

(b) the radiation of natural nuclides is measured by means of the first and second counter tubes in pulses per second, and respective count rates alpha$_1$ and alpha$_2$ are determined;

(c) the ratio alpha$_1$/alpha$_2$ is plotted graphically against alpha$_2$ and corresponding constant values a$_1$ and a$_2$ are determined for each counter tube in accordance with the least square fit method;

(d) the counter tubes are arranged with the second counter tube above the first counter tube, separated by the separating foil, so that the lower counter tube measures the radiation of both natural and artificial nuclides (count rate alpha$_1$) while the upper counter tube measures only the radiation of natural nuclides (count rate alpha$_2$);

(e) the air volume V in cubic meters flowing through the filter during the measurement time is measured; and (f) the resulting artificial aerosol alpha activity concentration C, in becquerels per cubic meter, is calculated in accordance with the formula $$C = \frac{1}{V} \cdot \frac{1}{eta} [\text{alpha}_1 - (a_1 \cdot \text{alpha}_2 + a_2) \text{alpha}_2]$$

in which eta is the sensitivity of the lower counter tube expressed as a decimal fraction. The separating foil preferably has a coating thereon with a mass of about 0.9 to 2 mg/cm$^2$.

4 Claims, 1 Drawing Sheet

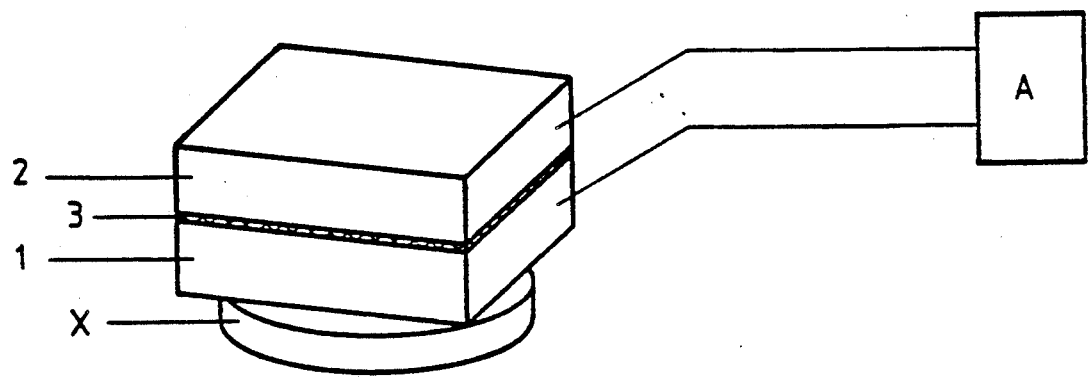

METHOD AND APPARATUS FOR DETERMINING THE ACTUAL ARTIFICIAL AEROSOL ALPHA ACTIVITY CONCENTRATION IN THE AIR

FIELD OF THE INVENTION

The invention relates to a method and an apparatus for determining the actual artificial aerosol alpha activity concentration in the air by means of two proportional counter tubes and an electronic evaluation system.

BACKGROUND OF THE INVENTION

The monitoring and/or determination of the concentration of artificial aerosol alpha activity in the air is absolutely necessary in plants which are engaged in the manufacture and preparation of fuel elements The measurement of these values could readily be carried out if natural aerosol activity concentrations such as decay products of radon and thoron were not present in the air. Radon and thoron decay products deposit on aerosols and are then measured as alpha activity. Complicating this, the natural radioactivity concentration can vary by a factor of 10 during the course of the day depending on meteorological conditions.

Because of these circumstances it is generally known, in order to carry out monitoring and/or determination of artificial radioactivity levels, to attempt to suppress the natural aerosol alpha activity concentration as far as possible, without thereby suppressing the artificial aerosol alpha activity concentration.

Two different methods and apparatus are known for determining the artificial aerosol alpha activity concentrations in the air, namely the ABPD (Alpha Beta Pseudocoincidence Difference) method and the APIA (Alpha Particles In Air) monitoring method. The latter is an alpha spectroscopic measurement method.

In the ABPD method, the deposits on aerosols, acting as alpha radiators, in the case of the radon series, RaA, RaC' and RaC, as well as the thoron decay products, ThA, ThC' and ThC, are used in order, by specific measurement of the RaC and RaC' as well as the ThC and ThC', to compensate for the natural alpha activity. For measuring RaC and RaC' specifically, the fact is utilized that upon a beta decay of RaC within the half-life of 160 milliseconds, an alpha decay of RaC' will take place with a probability of 50%. Since ThC' has a half-life of only 0.3 milliseconds, an alpha decay of ThC' takes place within 160 milliseconds practically of every beta decay. These successive beta-alpha decays are referred to as pseudocoincidences and represent a characteristic property of radon and thoron decay products. By the measurement of the pseudocoincidences the natural alpha activity can be determined, and by subtraction of these values from the values of the total alpha activity, the artificial alpha aerosol activity concentration can be determined.

Despite the advantages of the ABPD method, namely continuous online measurement, simultaneous measurement of aerosol alpha and beta activity concentrations with a low limit of detection, and large air flow (40 to 50 m³/per hour); there are also considerable disadvantages. The parameters of the external local conditions, such as weather, temperature, age of the air masses, local geology, etc., enter into the factors that must be taken into consideration, in order to compensate for the natural activity concentrations and thereby determine the result of the measurement of the artificial activity concentrations. The factors must be determined "on the spot". Similarly, extreme conditions such as rapid changes in the ventilation and changes in weather conditions must be measured by tests extending over several weeks. If the parameters of the local conditions change, then the ABPD method cannot, of course, respond rapidly, and there is therefore a slow adaptation to the changes.

The APIA method is an alphaspectroscopic method with high energy discrimination, by which many difficulties in the compensation of natural and artificial aerosol activity concentrations have been eliminated. The APIA method also has disadvantages, however, such as the low air flow of about 2,000 liters per hour, and the complicated and thus expensive construction of the dusting device and of the measurement chamber, since the detector must be operated under vacuum. Furthermore, the detector is exposed, unprotected, to the medium to be measured within the measurement space. Since this medium may also contain corrosive gases, it is possible for the use or the working life of the detector to be drastically limited.

SUMMARY OF THE INVENTION

The principal object of the present invention is to provide a method and an apparatus for determining the actual artificial aerosol alpha activity concentration in the air, in which the advantages of the ABPD and APIA methods are retained but their disadvantages avoided.

This object is achieved in accordance with the invention by the method and apparatus disclosed and claimed herein.

An example of a method according to the invention employs an electronic evaluation system and first and second proportional counter tubes, separated by a foil, to determine the actual concentration of artificial aerosol alpha activity in air. The invention may comprise the following steps:

(a) a filter is disposed in the stream of air flow and is thereby covered with dust, no artificial aerosol alpha activity being present;

(b) the radiation of natural nuclides is measured by means of the first and second counter tubes in pulses per second, and respective count rates alpha$_1$ and alpha$_2$ are determined;

(c) the ratio alpha$_1$/alpha$_2$ is plotted graphically against alpha$_2$ and corresponding constant values $a_1$ and $a_2$ are determined for each counter tube in accordance with the least square fit method;

(d) the counter tubes are arranged with the second counter tube above the first counter tube, separated by the separating foil, so that the lower counter tube measures the radiation of both natural and artificial nuclides (count rate alpha$_1$) while the upper counter tube measures only the radiation of natural nuclides (count rate alpha$_2$);

(e) the air volume V in cubic meters flowing through the filter during the measurement time is measured; and (f) the resulting artificial aerosol alpha activity concentration C, in becquerels per cubic meter, is calculated in accordance with the formula $$C = \frac{1}{V} \cdot \frac{1}{eta} [\text{alpha}_1 - (a_1 \cdot \text{alpha}_2 + a_2) \text{alpha}_2]$$

in which eta is the sensitivity of the lower counter tube expressed as a decimal fraction.

The separating foil may have a coating with a mass of about 0.9 to 2 mg/cm².

BRIEF DESCRIPTION OF THE DRAWING

One illustrative embodiment of the apparatus of the invention is shown schematically in the single Figure.

DETAILED DESCRIPTION OF THE EMBODIMENT

In the Figure, a dusted filter X is employed as a radiation source. It lies below a lower proportional counter tube 1 which measures both natural and artificial nuclides. The count rate of the counter tube 1 is detected, and designated $alpha_1$. A count rate $alpha_2$ is associated with the upper counter tube 2. Of course, the terms "lower," "upper," "above," and "below" are exemplary only, and other orientations of the various components are possible. Between the lower and upper counter tubes is a separating foil 3 with a coating mass of, for example, about 0.9 to 2 mg/cm², which is selected so that the upper counter tube 2 measures only the radiation of natural nuclides. The separating foil 3 may be part of the upper counter tube 2. The counter tubes 1 and 2 are connected to an electronic evaluation system A which is known per se and is therefore not described in detail.

With the device described above, the method of the invention is carried out. This method, which will be referred to as the Alpha Energy Range Discrimination (AERD) method for the determination of the actual artificial aerosol alpha activity concentration in the air, is carried out as follows.

First, in a calibration phase of the method, the counter tubes 1 and 2, arranged one above the other, are exposed, by the covering of dust on the filter X, to the radiation of natural nuclides. It must be seen to that there is no radiation present due to artificial nuclides. The count rate $alpha_1$ (impulses per second) of the counter tube 1 and the count rate $alpha_2$ of the counter tube 2 are determined. Their ratio to each other, $alpha_1/alpha_2$, is also determined and plotted graphically against $alpha_2$.

Then, constant factors $a_1$ and $a_2$ are determined by the following method. In a series of experiments the count rates $alpha_1$ and $alpha_2$ are determined for various activity concentrations. For each experiment the ratio $alpha_1/alpha_2$ is plotted against $alpha_2$.

Then, in accordance with the least square fit method, a straight line—$Y = m \cdot x + b$—is found which is equally distant from all the plotted measurement points. The factors $a_1$ and $a_2$ are determined on the basis of this line. The factor $a_1$ is the angle of inclination m, and the factor $a_2$ is the y-axis intercept b. The constant values $a_1$ and $a_2$ may be, for example, about 0.029 and 3.682, respectively, as determined in an actual experiment. The factors $a_1$ and $a_2$ are determined only once and then are employed in subsequent measurements made with the system.

After determining these values $a_1$ and $a_2$, the apparatus, consisting of the two proportional counter tubes 1 and 2, the separating foil 3, the electronic evaluation system A and the filter X, is exposed to the radiation of both natural and artificial nuclides in order to measure the actual artificial aerosal alpha activity concentration.

The foil is selected so that an alpha particle emitted by the accumulated aerosol in the filter X will not be detected by the counter tube 2, if its energy is lower than, for example, 6 MeV, according to the well-known energy-range relationship for alpha particles, before any artificial nucleotides are admitted. Natural nuclides tend to have higher energy than artificial nuclides. Thus, the foil 3 excludes artificial alpha particles from the counter tube 2 according to their energy.

For example, the separating foil may be a Mylar-foil sheet with a coating mass of about 0.9 mg/cm². Experiments have shown that under actual test conditions this foil ensures that no alpha activity will be detected by counter 2, if $^{241}$Am is used as the source, while a natural alpha-emitter will cause high impulse rates in counter 2. Such natural alpha-emitters are $^{218}$Po (6.00 MeV), $^{214}$Po (7.7 MeV), $^{212}$Bi (6.05 MeV), and $^{212}$Po (8.8 MeV).

Accordingly, the count rate $alpha_1$ of the counter tube 1 will comprise both natural and artificial nuclide radiation, while the count rate $alpha_2$ of the counter tube 2 will comprise only the radiation of natural nuclides. At the same time, the volume V which flows through the filter X during the measurement time is measured in cubic meters. The sensitivity of the counter tubes—only the sensitivity eta of the lower counter tube 1 being of importance for the AERD method—is on the average about 0.2. Given these measurement values, the artificial aerosol alpha activity concentration C which is present can be calculated in becquerels per cubic meter by the formula:

$$C = \frac{1}{V} \cdot \frac{1}{eta} [alpha_1 - (a_1 \cdot alpha_2 + a_2) alpha_2]$$

The value eta is the well-known detector efficiency parameter.

Thus, by the initial determination of the constant values $a_1$ and $a_2$ in the manner described above, a volume of air or a stream of air containing both natural and artificial nuclides can be readily examined with this method to determine the concentration of artificial alpha-emitting aerosols Experiments have shown that artificial. activity concentrations of less than 0.037 becquerel per cubic meter can be detected with statistical significance in the presence of strongly varying concentrations of natural activity which lie more than an order of magnitude above the artificial activity.

The AERD method has the advantage over the present state of the art that even strong variations in the concentration and composition of the natural alpha-emitting aerosols do not cause any error in measurement. The AERD method can carry out completely automatic, online-measuring air monitoring, for very low artificial alpha aerosol activity concentrations, and with a high rate of air flow.

Furthermore, a monitor based on the AERD method can measure artificial alpha-emitting aerosols immediately after a filter change, and can do so with great sensitivity. In this way, it is no longer necessary to wait until the saturation of natural short-life aerosols has been reached.

Although the invention has been described in connection with a specific embodiment thereof, the appended claims are not so limited, but are to be construed as embodying all modifications and variations that may occur to one of ordinary skill in the art that fairly fall within the teachings set forth herein.

What is claimed is:

1. A method of determining the actual concentration of artificial aerosol alpha activity in air by employing an electronic evaluation system and first and second proportional counter tubes separated by a foil, comprising the following steps:
   (a) a filter is disposed in a stream of air flow and is thereby covered with dust, no artificial aerosol alpha activity being present;
   (b) the radiation of natural nuclides is measured by means of the first and second counter tubes in pulses per second, and respective count rates $alpha_1$ and $alpha_2$ are determined;
   (c) that ratio $alpha_1/alpha_2$ is plotted graphically against $alpha_2$ and corresponding constant values $a_1$ and $a_2$ are determined for each counter tube in accordance with the least square fit method;
   (d) the filter is disposed in a stream of air containing natural and artificial radioactive aerosols and thereby forming a radioactive dust coating thereon; the counter tubes are arranged with the second counter tube above the first counter tube, separated by the separating foil, so that the lower counter tube is adjacent to the filter and measures the radiation of both natural and artificial nuclides (count rate $alpha_1$) while the upper counter tube measures only the radiation of natural nuclides (count rate $alpha_2$);
   (e) the air volume V in cubic meters flowing through the filter during the measurement time is measured; and
   (f) the resulting artificial aerosol alpha activity concentration C, in becquerels per cubic meter, is calculated in accordance with the formula $$C = \frac{1}{V} \cdot \frac{1}{eta} [alpha_1 - (a_1 \cdot alpha_2 + a_2) \, alpha_2]$$

in which eta is the sensitivity of the lower counter tube expressed as a decimal fraction.

2. A method as claimed in claim 1, wherein the separating foil has a coating with a mass of about 0.9 to 2 mg/cm$^2$.

3. An apparatus for determining the actual concentration of artificial alpha aerosol activity in air, comprising:
   collecting means for collecting dust to serve as a radiation source,
   first and second alpha activity counting means disposed with said second counting means above said first counting means; the collecting means being disposed below said first counting means; separating means between said first and second counting means for ensuring that the first counting means measures the radiation of both natural and artificial nuclides (count rate $alpha_1$), while the second counting means measures the radiation of only natural nuclides (count rate $alpha_2$);
   means connected to said first and second counting means for receiving said count rates $alpha_1$ and $alpha_2$ and determining therefrom respective constant values $a_1$ and $a_2$ in accordance with the least square fit method;
   means for measuring the volume V in cubic meters flowing through the collecting means during a measurement time; and
   means for receiving the foregoing values $alpha_1$, $alpha_2$, $a_1$ and $a_2$, as well as the sensitivity eta of the first counting means expressed as a decimal fraction, and determining therefrom the resulting artificial aerosol alpha activity concentration C, in becquerels per cubic meter, in accordance with the formula $$C = \frac{1}{V} \cdot \frac{1}{eta} [alpha_1 - (a_1 \cdot alpha_2 + a_2) \, alpha_2].$$

4. An apparatus as claimed in claim 3, wherein said separating means comprises a separating foil which has a coating with a mass of about 0.9 to 2 mg/cm$^2$.

* * * * *